(12) United States Patent
Carvalho et al.

(10) Patent No.: US 10,142,144 B2
(45) Date of Patent: Nov. 27, 2018

(54) TRANSMISSION METHOD

(71) Applicants: Paulo Miguel Carvalho, Lisbon (PT); Rui Miguel Dinis, Costa da Caparica (PT); Vitor Hugo Astucia, Sobreda (PT)

(72) Inventors: Paulo Miguel Carvalho, Lisbon (PT); Rui Miguel Dinis, Costa da Caparica (PT); Vitor Hugo Astucia, Sobreda (PT)

( * ) Notice: Subject to any disclaimer, the term of this patent is extended or adjusted under 35 U.S.C. 154(b) by 0 days.

(21) Appl. No.: 15/130,949

(22) Filed: Apr. 16, 2016

(65) Prior Publication Data

US 2018/0048369 A1 Feb. 15, 2018

(51) Int. Cl.
*H04B 7/06* (2006.01)
*H04B 1/04* (2006.01)
*H04L 27/20* (2006.01)

(52) U.S. Cl.
CPC .......... *H04L 27/20* (2013.01); *H04B 1/0483* (2013.01); *H04B 7/0613* (2013.01)

(58) Field of Classification Search
CPC .. H04B 7/0613; H04B 7/0413; H04B 7/0619; H04B 7/0452; H04B 7/06; H04B 7/0689; H04B 7/063; H04B 1/0483
USPC .......................................... 375/340; 370/315
See application file for complete search history.

(56) References Cited

U.S. PATENT DOCUMENTS

2003/0215023 A1* 11/2003 Chang .................. H04L 1/0054
375/265
2007/0223622 A1* 9/2007 Bang ..................... H04L 1/0625
375/299

* cited by examiner

*Primary Examiner* — Sam K Ahn
*Assistant Examiner* — Sarah Hassan

(57) ABSTRACT

A transmission method based on multiple antennas with directivity at the information level. In this transmission system, the directivity is introduced in the transmitted information by an optimization of the constellation's symbols only in the desired direction, keeping at same time an isotropic radiation power pattern by the antenna array The method allows the transmission of modulations with multilevel constellations based on M-QAM (M-ary Quadrature Amplitude Modulation) constellations, Voronoi constellations or M-PSK (M-ary Phase Shift Keying), using a decomposition of multilevel modulation into a sum of M' polar or BPSK (Binary-PSK) constellations that are amplified and transmitted by separate antennas. Therefore it uses up to M' parallel modulators, each one followed by an amplifier connected to an antenna. This transmission scheme transmits up to M' uncorrelated BPSK signals, that are added in the transmission channel to form a multilevel constellation.

6 Claims, 7 Drawing Sheets

TRANSMISSION METHOD

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

STATEMENT REGARDING PRIOR DISCLOSURES BY THE INVENTOR OR A JOINT INVENTOR

BACKGROUND OF THE INVENTION

Field of the Invention

The present invention relates to telecommunication systems. More particularly, the present invention relates to a transmission architecture which make use of multiple antenna and amplifiers to transmit large symbols' constellations, that is compatible with low-cost, highly-efficient, nonlinear amplifiers, while allowing information directivity in the transmitted symbols.

Description of Related Art

Wireless communication systems must fulfill several requirements that include spectral and power efficiency, low interference level, robustness against jamming and security. In broadband communications requirements such as spectral efficiency and energy efficiency are equally important to support high transmission rates while minimizing the energy consumption of mobile devices. This can be achieved through the use of multilevel modulations and energy efficient amplification techniques.

Multilevel modulations can improve spectral efficiency of communication systems, despite the fact that this increase spectral efficiency may come at the expense of a reduced power efficiency, which is undesirable in systems where power consumption is a constraint, such as in broadband mobile wireless systems. Power efficiency can be assured through, an efficient amplification operation. However, as referred in [1], due to the envelope fluctuations of multilevel constellations, the amplifiers must work far from the saturation to avoid nonlinear effects.

The decomposition of a size-M multilevel modulations based on M-QAM (Quadrature Amplitude Modulation), Voronoi or M-PSK (Phase Shift Keying) constellations, into a sum of M'≤M BPSK (Binary-Phase Shift Keying), QPSK (Quadrature Phase Shift Keying) or OQPSK (Offset QPSK) components with constant or quasi-constant envelope allows the use of nonlinear amplifiers, which can maximize the power efficiency of the transmission system. In the documents [2] and [3], it was proposed a representation method of multilevel constellations in terms of OQPSK components. However, the proposed representation was applied for the definition of coded schemes resulting from the combination of several nonlinear OQPSK components in which each coded schemes was decomposed. Moreover, a conventional amplification was employed for the resulting multilevel constellation. Thus, nonlinear distortion due to high power amplification was not avoided due to the envelope fluctuations of the resulting constellation.

Since QPSK signals can be viewed as a sum of two BPSK components in quadrature and OQPSK signal can be regarded as BPSK when referred to the appropriate carrier frequency, they both can be decomposed in BPSK sub-constellations.

One can describe a generic constellation as the sum of M'≤M BPSK or OQPSK sub-constellations, wherein the constellation symbols may be expressed as a function of the information bits $\beta^{(m)}$ in accordance with the expression $$a_n = g_0 + g_1 b_n^{(1)} + g_2 b_n^{(2)} + g_3 b_n^{(1)} b_n^{(2)} + g_4 b_n^{(3)} + \ldots = \sum_{i=0}^{M-1} g_i \prod_{m=1}^{\mu} (b_n^{(m)})^{\gamma_{(m,i)}}$$

for each $\alpha_n \in A$, where $(\gamma_{(\mu-1,i)}, \gamma_{(\mu-2,i)}, \ldots, \gamma_{(2,i)}, \gamma_{(1,i)})$ is the binary representation of i, $b_n^{(m)} = 2\beta^{(m)} - 1$ denotes the polar representation of the bits, $\mu = \log_2(M)$ and $g_i$ is a complex coefficient associated to the definition of each sub-constellation BPSK, i.e. the corresponding amplitude and phase.

Since power-efficient constellations have zero mean, the complex coefficient associated to the zero order sub-constellation is null, i.e. $g_0 = 0$ and we only need at maximum M'=M−1 BPSK signals to generate a multilevel constellation. In the particular case of M-QAM constellations it can be shown that all constellation symbols can be characterized with only M'=μ=$\log_2(M)$ BPSK signals, since the remaining $g_i$ coefficients are zero. For instance, the 16-QAM with Gray mapping only needs four BPSK signals defined by the set of non-zero complex coefficients $g_6 = j$, $g_7 = j$, $g_8 = 2$ and $g_9 = 1$ (actually, this corresponds to only two QPSK constellations).

At the transmitter, the multilevel constellations are decomposed into a sum of BPSK or QPSK components which are amplified separately. This allows ally good power amplification efficiency together with the high spectral efficiency achieved by multilevel constellations.

To increase robustness of point-to-point communication systems against interference and malicious interception more highly directive beam of radiation can be used. Hence, by arranging elementary radiators into an array, a more directive beam of radiation can be obtained. This was shown in [4]. A more directive beam means that the antenna array will also have a higher gain. The other important requirement for a communication system is high ratio of the signal to interference. In the document [5] it is described the classical approach to achieve this which it is based on the suppression of interference and multipath signals and obtaining nulls in the directions of interfering signals. Current synthesis methods, as those described in [6] and [7], try to reduce interference by two ways: by reducing or even suppressing the side lobe level, whereas preserving the gain of the main beam; by introducing nulls in the radiation pattern in the directions where exists interference and jamming. However, for all these methods the transmitted signal by each antenna is the same in all directions although attenuated outside the main direction of the antenna, according to the array's radiation pattern.

In [8] it is disclosed a method of transmitting data based on an M-QAM modulation with nonlinear amplification. The transmission technique proposed in this application follows a different approach because the transmitter employs M'≤M antennas in parallel, on for each of the BPSK or QPSK signals in which the multilevel constellation is decomposed.

In [9] there are disclosed antenna arrays aimed to achieve a directive radiation pattern diagram, since the signals transmitted by the different antennas are correlated. The transmission structure proposed in this application, although based on one-dimensional or two-dimensional antenna arrays, does not achieve a directive radiation pattern since the signals transmitted by different antennas are uncorrelated, contrarily to what happens in [9].

Although it uses a set of antennas, the directivity of the disclosed method in the present application is introduced through a dependency on the configuration of constellations points on the desired direction of transmission. It should be noted that this directivity on the transmitted information is not accompanied by a maximization of radiation pattern in the desired transmission direction. Therefore, in contrast to the cases described in [9] cited document, the radiated power is not modified to maximize the radiated power in a given direction.

In the method disclosed in the present application, the signals in each antenna have different phases and data, since they use independent and uncorrelated bit streams. There is no a maximization of the radiation pattern on a specific direction but a constellation's configuration that depends on the desired transmission direction. Consequently, the optimization of the transmitted constellation in the desired direction does not change the power radiated in the same direction.

It should be also noted that the spatial factor associated with the transmitted constellation is not associated to the radiation pattern, contrarily to what was proposed in [9]. The signals at each of the antennas are independent, so it is not possible to define a spatial factor for the radiation pattern for the antenna array. In the present application the various constituent signals suffer phase rotations according to their position on the set of transmit antennas so that the constellation is optimized in the desired direction.

It should be mentioned that under these conditions and contrarily to the usual approach it is not possible to define a spatial factor for the antenna array that affects the radiated field. However, it can be defined an equivalent special factor that affects the constellation configuration and each sub-constellation. The closest case consists on a transmission of M' signals in parallel, similarly to what happens in a MIMO (Multiple-Input Multiple-Output) system, but unlike the MIMO wherein each signal is associated to a well defined signal now each signal belongs to one of sub-constellations in which the constellation is decomposed. Also, unlike the MIMO without pre-coding, where at the receiver each signal can be received and decoded separately, the receiver for the proposed method needs to combine the M' received signals to generate the transmitted symbol and only after this operation may decode the transmitted bits.

Document [10] discloses a transmission method to increase the system's throughput and where there is no decomposition of the constellation into sub-constellations. Moreover, the method uses a single antenna, since all signals after the multiplication by the spreading sequences are combined and transmitted by only one antenna.

In [11] there are disclosed methods for nonlinear encoding of 16-OQAM schemes, based on two nonlinear OQPSK signals specially designed to allow higher amplification efficiency due to its robustness against nonlinear distortions.

In [12] there are disclosed pragmatic FDE (Frequency Domain Equalization) receivers that have low complexity but allow excellent performance, even for large QAM constellations and highly non-uniform offset constellations. A more detailed study about the reason behind the poor performance of modulations equalized with conventional FDE schemes is also presented.

The decomposition of the constellations of the present application is generic since that the constituent signals may be of BPSK, QPSK or OQPSK when there is any temporal offset between in-phase and quadrature components, and is not restricted to the serial OQPSK format described by (Eq. 9) and (Eq. 10) in [11] and [12].

It should be stressed out that this format can be also associated with a representation of OQPSK signals based on Volterra decomposition that can be applied to describe the nonlinear effects of memoryless bandpass nonlinearity on OQPSK type signals. One advantage of this format is that it remains invariant after passing through a non-linearity, which makes possible the analytical characterization of non-linear effects. In the present method, such a restriction is not applied since the signals used in each of the branches have constant or almost constant envelope, by selecting a pulse shape like MSK (Minimum Shift Keying), GMSK (Gaussian MSK) or other pulse shapes assuring a very low level of envelope fluctuations unlike the usual square-root raised-cosine pulses. This aspect is omitted in the diagram of the transmitter, where the modulator may be a BPSK, QPSK or OQPSK modulator with changes in the pulse shapes.

BRIEF SUMMARY OF THE INVENTION

The method presented herein implements a directive transmission where the directivity is introduced through a dependency on the configuration of constellations points on the desired direction of transmission. The method may be applied to any constellation.

The embodiments disclosed herein allow the transmission of signals with directivity introduced at the constellation level, since the constellation is optimized for a desired direction. This directivity in the information does not affect necessarily the radiation pattern of the set of antennas. There is only a proper configuration of the constellation and there are no changes in the radiation pattern or a maximization of the transmitted power in the desired direction. The method can be used to reduce interference between users or to implement secure communications at physical layer.

The present application describes a transmission method comprising the following steps:

μ antipodal signals obtained at the output of antipodal converter 102 of the sequences obtained at the output of serial/parallel converter 101 are subjected to the input of the sequence mapping generator 103 which calculates M mapping sequences, i.e. for the set of values i=0,2, . . . ,M−1 obtains the product of antipodal symbols defined by defined by:

$$b_n^{eq(i)} = \prod_{m=1}^{\mu} (b_n^{(m)})^{\gamma(m,i)},$$

where n is the order of the n-th symbol to transmit, m represents a auxiliary index with m=1, . . . , μ, μ=log$_2$(M) and γ(m,i) is a binary term of $(\gamma_{(\mu-1,i)}, \gamma_{(\mu-2,i)}, \ldots, \gamma_{(1,i)}, \gamma_{(0,i)})$ which is the binary representation of i;

each of the M' polar components is modulated by 104 and the output of each modulator 104 is multiplied by the corresponding complex coefficient $g_i$, resulting for each branch of order i the signal $$\sum_{n=0}^{N-1} g_i b_n^{eq(i)} r(t-nT),$$

where N is the number of transmitted symbols in each data block, n is the order of the block element, r(t) is a pulse whose shape is selected to minimize envelope fluctuations, t represents the time, and T represents the time duration of each symbol in the block of symbols to be transmitted, which comprises a BPSK, QPSK or a OQPSK sub-constellation that. results from the decomposition of the multilevel constellation;

each of the M' signals, is then amplified by the nonlinear amplifier 105 and sent directly to the transmit antenna 107 of his branch.

In another embodiment, the multilevel constellation's symbols used in the transmission method are decomposed into BPSK, QPSK or OQPSK sub-constellations and expressed in terms of information bits $\beta^{(m)}$ for each $\alpha_n \in A$, according to the expression:

$$a_n = g_0 + g_1 b_n^{(1)} + g_2 b_n^{(2)} + g_3 b_n^{(1)} b_n^{(2)} + g_4 b_n^{(3)} + \ldots = \sum_{i=0}^{M-1} g_i \prod_{m=1}^{\mu} (b_n^{(m)})^{\gamma(m,i)},$$

where $(\gamma_{(\mu-1,i)}, \gamma_{\mu-2,i)}, \ldots, \gamma_{(1,i)}, \gamma_{(0,i)})$ is the binary representation of i, $b_n^{(m)} = 2\beta_n^{(m)} - 1$ and $g_i$, i=0,1, ..., M-1 is a complex coefficient associated to the amplitude and phase of each sub-constellation and where the M outputs of the mapping sequence generator 103 are selected based on the terms present in the constellation's characterization given by the above expression.

In another embodiment, the transmission method uses a antenna belonging to an antenna array with M' elements that can be one-dimensional or two-dimensional.

In one embodiment, the output signals from the set of transmit antennas that use the transmission method consists on M' signals from each of the M' antennas 107 in parallel, defined by:

$$a'_n = \sum_{i=0}^{M-1} F_{A_i} g_i \prod_{m=1}^{\mu} (b_n^{(m)})^{\gamma(m,i)},$$

where $F_{A_i}$ represents the term of array factor associated with the i-th antenna.

In one embodiment, the receiver for this transmission method comprises a set of antennas with the same arrangement of the transmitter where each antenna is implemented with $F_{A_i} g_i$, which $F_{A_i}$ represents the i-th term of the antenna array factor.

In another embodiment, when the antenna array is the broadside type the transmitted signal by the transmission method, is described by:

$$a'_n = \sum_{i=0}^{M-1} F_{A_i} g_i \prod_{m=1}^{\mu} (b_n^{(m)})^{\gamma(m,i)},$$

with the term of the array factor for the i-th antenna described by $$F_{A_i} = e^{j2\pi i \frac{d}{\lambda} \cos\left(\frac{\pi}{2} + \theta\right)},$$

where d is the spacing between antennas, $\lambda$ is the wavelength and $\theta$ the direction angle in which the that transmitter optimizes constellation with the information symbols, and transmitted constellations 16, 32 and 64 symbols show the spatial rearrangements needed for this angle.

Embodiments of the invention are defined in the dependent claims. Other objects, advantages and novel features of the invention will become apparent from the following detailed description of the invention when considered in conjunction with the accompanying drawings and claims.

BRIEF SUMMARY OF THE INVENTION

The present application describes a transmission method based on arrays of antennas in which the directivity is not associated to the radiated power but is introduced at the information level on the transmitted constellation. In this transmission system, the directivity is introduced in the transmitted information by an optimization of the constellation's symbols only in the desired direction, keeping at same time an isotropic radiation pattern for the power radiated by the antenna array. The positioning of the symbols belonging to the constellation is done in way to assure that only in the desired direction it is transmitted the optimized constellation and a degenerated constellation for the other directions. The transmission scheme is implemented to maximize the impact of errors relative to the transmission's direction in the performance of the system so as to increase the directivity of the transmitted information.

In the technology presented in the present application, the approach is very different from classical approach of [9], since the signals transmitted by the antennas are uncorrelated. Therefore, there is no change in the antenna array's radiation pattern, since the power is radiated isotropically. The directivity is introduced in the transmitted information, since the shape of the transmitted constellation is optimized only in the desired direction, being transmitted a degenerated constellation in other directions. It is also a strictly directive transmission scheme, but where the directivity is introduced implicitly in the arrangement of the constellation's symbols associated with the desired direction of transmission. In this new approach, various constellations are decomposed into BPSK, QPSK or OQPSK components, which are in turn amplified and transmitted separately. Unlike the classical approach, now each antenna transmits different and uncorrelated signals, since the coefficients associated with each antenna of the array, are the coefficients associated to the decomposition of multilevel modulations into a sum of BPSK elementary components.

Therefore, in a point-to-point communication, the receiver must know the parameters of the constellation's configuration associated to the array of antennas and amplifiers' coefficients, otherwise it will receive a degenerated signal. Therefore, the proposed method increases the robustness against interceptions and reduces interference among users.

Since the BPSK signals at the input of each amplifier can be designed to have low envelope fluctuation, which can be achieved by a selection of a suitable pulse shape it is possible to use strongly nonlinear amplifiers, such as class C amplifiers that have higher amplification efficiency and are more simple and inexpensive to implement.

BRIEF DESCRIPTION OF THE FIGURES

For an easier understanding of the embodiment the figures are attached, which represent preferred embodiments that, however, do not intend to limit the scope of the present embodiment.

DETAILED DESCRIPTION OF THE INVENTION

Figure 1:
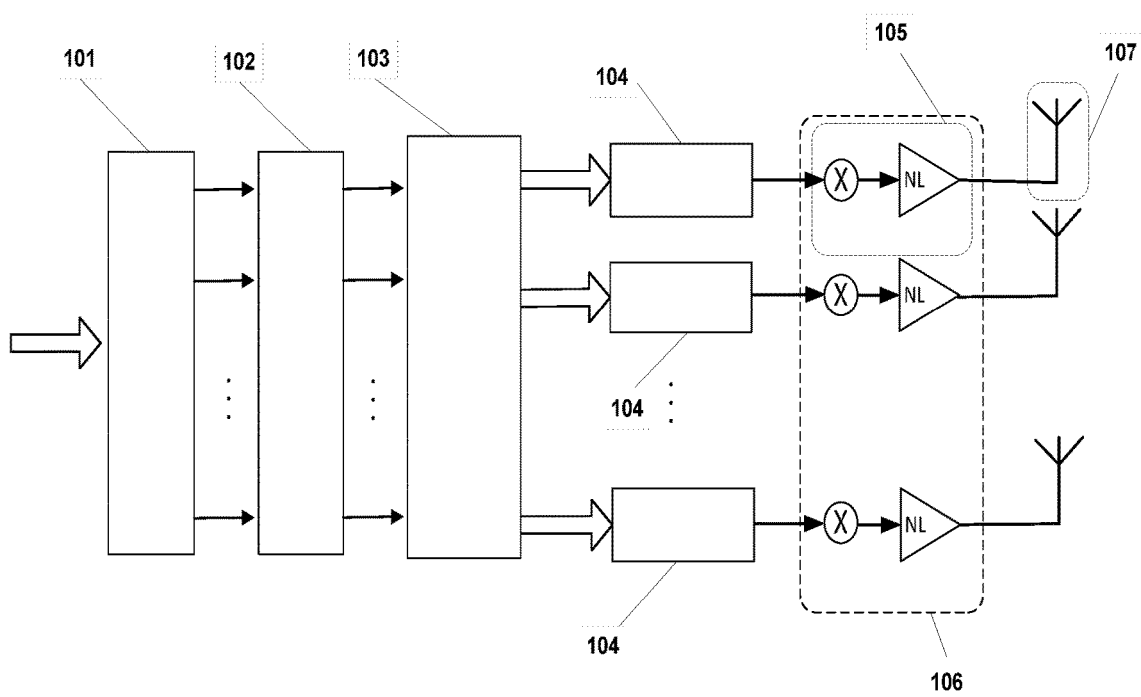
FIG. 1 shows a diagram of the transmitter's structure where the serial/parallel converter 101 receives a stream of information bits that converts into the µ-bit sequences that are subsequently converted into µ polar sequences by the antipodal converter 102. These antipodal sequences are the inputs of the mapping sequences generator 103 whose outputs are modulated in each branch by the respective modulator 104, amplified by an amplifier 105 and transmitted by a set of antennas in parallel, using for this purpose M' branches in parallel each with a modulator 104, a amplifier 105 and a antenna 107. The set of amplifiers 105 is the amplification stage 106.

Referring to the figures, it will now be described technology using different embodiments of the same technology, which is not intended to limit the scope of protection of this application. The embodiments are composed by a method of sequential steps as described below.

The sequence of information bits {β} is submitted to the serial/parallel converter 101 with µ outputs, where the serial sequence of m bits {β} is converted in a set of m' bits in parallel $\beta_n^{(1)}, \beta_n^{(2)}, \ldots, \beta_n^{(\mu)}$. The µ bits in parallel will be the inputs for the antipodal converter 102. In the antipodal converter 102 the bits are converted to one antipodal signal by one transformation defined as $$b_n^{(m)} = 2\beta_n^{(m)} - 1$$

or $$b_n^{(m)} = (-1)^{\beta_n^{(m)}}.$$

The resulting µ antipodal signals at the output of the antipodal converter 102 are submitted at the input of the mapping sequences generator 103. The mapping sequences generator 103 computes M' mapping sequences, with M'≤M, for the set of values i=0,2,...,M−1 obtaining the antipodal symbols defined by $$b_n^{eq(i)} = \prod_{m=1}^{\mu} (b_n^{(m)})^{\gamma(m,i)},$$

where $(\gamma_{(\mu-1,i)}, \gamma_{(\mu-2,i)}, \ldots, \gamma_{(1,i)}, \gamma_{(0,i)})$ denotes the binary representation of i.

On the other hand, the symbols $\alpha_n$ belonging to a multi-level constellation can be expressed as a function of the information bits $\beta^{(m)}$ in accordance with the expression $$a_n = g_0 + g_1 b_n^{(1)} + g_2 b_n^{(2)} + g_3 b_n^{(1)} b_n^{(2)} + g_4 b_n^{(3)} + \ldots = \sum_{i=0}^{M-1} g_i \prod_{m=1}^{\mu} (b_n^{(m)})^{\gamma(m,i)}$$

For each $\alpha_n \in A$ where A represents the set of constellation's symbols, $(\gamma_{(\mu-1,i)}, \gamma_{(\mu-2,i)}, \ldots, \gamma_{(1,i)}, \gamma_{(0,i)})$ is the binary representation of i and $b_n^{(m)} = 2\beta_n^{(m)} - 1$. The M' outputs of the mapping sequences generator 103, i. e. the elements from the sequences $$\{b_n^{eq(1)}\},$$
$$\{b_n^{eq(2)}\},$$
$$\{b_n^{eq(3)}\},$$
$$\vdots$$
$$\{b_n^{eq(M')}\},$$

are selected according to the terms in the previous expression for the characterization of multilevel constellation as a sum of sub constellations. Each one of M' outputs $b_n^{eq(i)}$ will be the input of modulator 104. In each branch at the modulator's output 104, obtains a signal $$\sum_{n=0}^{N-1} b_n^{eq(i)} r(t - nT)$$

where r(t) represents a pulse with a shape selected to minimize the envelope fluctuations and ensures little or no ISI (InterSymbol Interference) at the matched filter's output.

In each branch the signal obtained at the output of the modulator 104 is amplified by the amplification stage 106, composed by a product and a nonlinear amplifier 105. For the generic ith branch, the signal at the modulator's output 104 is multiplied by the complex coefficient $g_i, i=0, 1, \ldots, M-1$ resulting for the i-nth branch the signal $$\sum_{n=0}^{N-1} g_i b_n^{eq(i)} r(t - nT), i = 0, 1, 2, \ldots, M - 1.$$

This signal is sent to the transmission antenna 107.

The amplification stage 106 is composed by M' amplifiers 105 in parallel with each amplifier connected to an antenna 107. The transmission structure is then composed by a set of M' non-linear amplifiers and a set of M' transmit antennas in parallel, which amplifies the signals and transmits M' BPSK uncorrelated signals that generate the multilevel constellation when summed. Before the amplification stage 106 there is a mapping sequence generator that receives the information bits and separates them into M' independent subsets that will be the M' inputs for the M' BPSK modulators.

Figure 2:
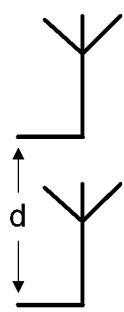
FIG. 2 illustrates a detailed diagram of the arrangement of the antenna array from FIG. 1 where M' antennas have a separation distance d from each other.
Figure 2:
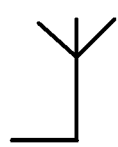
Figure 3:
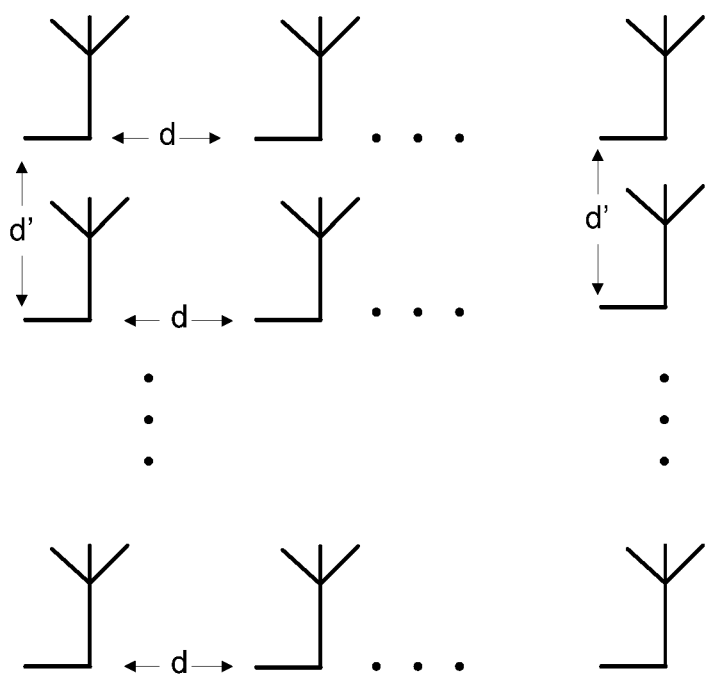
FIG. 3 illustrates a detailed diagram of the spatial arrangement of the antenna array in a two-dimensional array having the antennas a separation distance d from each other according to the horizontal axis, and a distance d' separating each other in the vertical axis.

All antennas are equal, i.e. they have same radiation pattern and gain. It is also assumed that each antenna has a current's phase excitation difference with respect to the phase of the excitation current of the previous antenna in the antenna array. The antennas of the transmitter of FIG. 1 may be equally spaced, being positioned along a line as illustrated in the linear array shown in FIG. 2. However, in a planar array the transmit antennas can be positioned with different spacing for the two dimensions as shown for the case of the planar spatial arrangement depicted in FIG. 3.

Since the BPSK or QPSK components signals in the several amplifiers and antennas are uncorrelated, the resulting radiation diagram remains omnidirectional in the broad sense. However, a slight change of the diagram due the superposition of the radiation patterns of the various antennas can occur. Now, the excitation of the antennas does not aim to get a steering diagram as in the classical approach, being the directivity introduced at the level of transmitted information through a rearrangement of the symbols of the constellation according to the desired direction of transmission.

Figure 4:
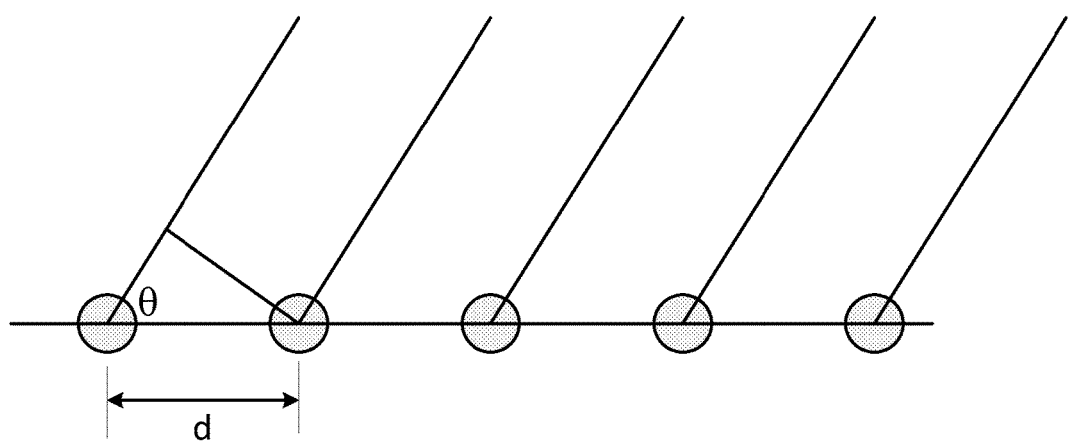
FIG. 4 illustrates a detailed diagram of the arrangement of a set of one-dimensional broadside array where d is the spatial separation between antennas and θ is the angle of the direction in which the antenna array optimizes the constellation with the information symbols.

In another embodiment, it is considered a unidimentional broadside array with the radiation pattern maxima occurring in the directions perpendicular to the line of where the array antennas are positioned. The radiating pattern of the array depends on the configuration, the distance between the elements, the amplitude and phase excitation of the elements, and also the radiation pattern of individual elements. Usually, the spacing of elements in a broadside array is kept smaller than a wavelength and we considered equal spaced isotropic antennas by d as shown in FIG. 4 (the spacing d between antennas can assume different values contrarily to the uniform arrangement exemplified). In this case, we have a non-uniform linear array since the current magnitudes of the different antennas depend on the amplification coefficients associated to the constellation design. For 16 QAM and Voronoi constellations the coefficients are those presented in tables 1 and 2. Under these conditions, the Array Factor of an M'-element linear array of isotropic sources is given by $$G_A = g_i e^{j\left(2\pi i \frac{d}{\lambda} \cos(\pi/2 + \theta)\right)},$$

where $g_i$ are the complex coefficients used in the decomposition of a multilevel constellation into a sum of sub-constellations.

TABLE 1

Example of the coefficient values $g_i$ for a centered sort order of the antennas in the array - Centered order.

| CENTER | QAM | VORONOI |
|---|---|---|
| g0 | 0 | −0.100 + j 0.075 |
| g1 | 0 | −0.014 − j 0.124 |
| g2 | 0 | −0.014 − j 0.124 |
| g3 | 0 | 0.086 − j 0.199 |

TABLE 1-continued

Example of the coefficient values $g_i$ for a centered sort order of the antennas in the array - Centered order.

| CENTER | QAM | VORONOI |
|---|---|---|
| g4 | 0 | 0.086 − j 0.199 |
| g5 | 0 | −0.201 + j 0.149 |
| g6 | j | 0.359 + j 0.273 |
| g7 | 2j | 0.717 + j 0.546 |
| g8 | 2 | −0.588 + j 0.572 |
| g9 | 1 | −0.186 + j 0.273 |
| g10 | 0 | 0.029 + j 0.248 |
| g11 | 0 | 0.086 − j 0.199 |
| g12 | 0 | 0.086 − j 0.199 |
| g13 | 0 | −0.100 + j 0.075 |
| g14 | 0 | −0.100 + j 0.075 |
| g15 | 0 | 0.000 |

TABLE 2

Example of the coefficient values $g_i$ for a linear sort order of the antennas in the array - linear sort.

| LINEAR | QAM | VORONOI |
|---|---|---|
| g0 | 2j | 0.717 + j 0.546 |
| g1 | 2 | −0.588 + j 0.572 |
| g2 | j | 0.359 + j 0.273 |
| g3 | 1 | −0.186 + j 0.273 |
| g4 | 0 | −0.201 + j 0.149 |
| g5 | 0 | 0.029 + j 0.248 |
| g6 | 0 | 0.086 − j 0.199 |
| g7 | 0 | 0.086 − j 0.199 |
| g8 | 0 | 0.086 − j 0.199 |
| g9 | 0 | 0.086 − j 0.199 |
| g10 | 0 | −0.014 − j 0.124 |
| g11 | 0 | −0.100 + j 0.075 |
| g12 | 0 | −0.014 − j 0.124 |
| g13 | 0 | −0.100 + j 0.075 |
| g14 | 0 | −0.100 + j 0.075 |
| g15 | 0 | 0.000 |

Figure 5:
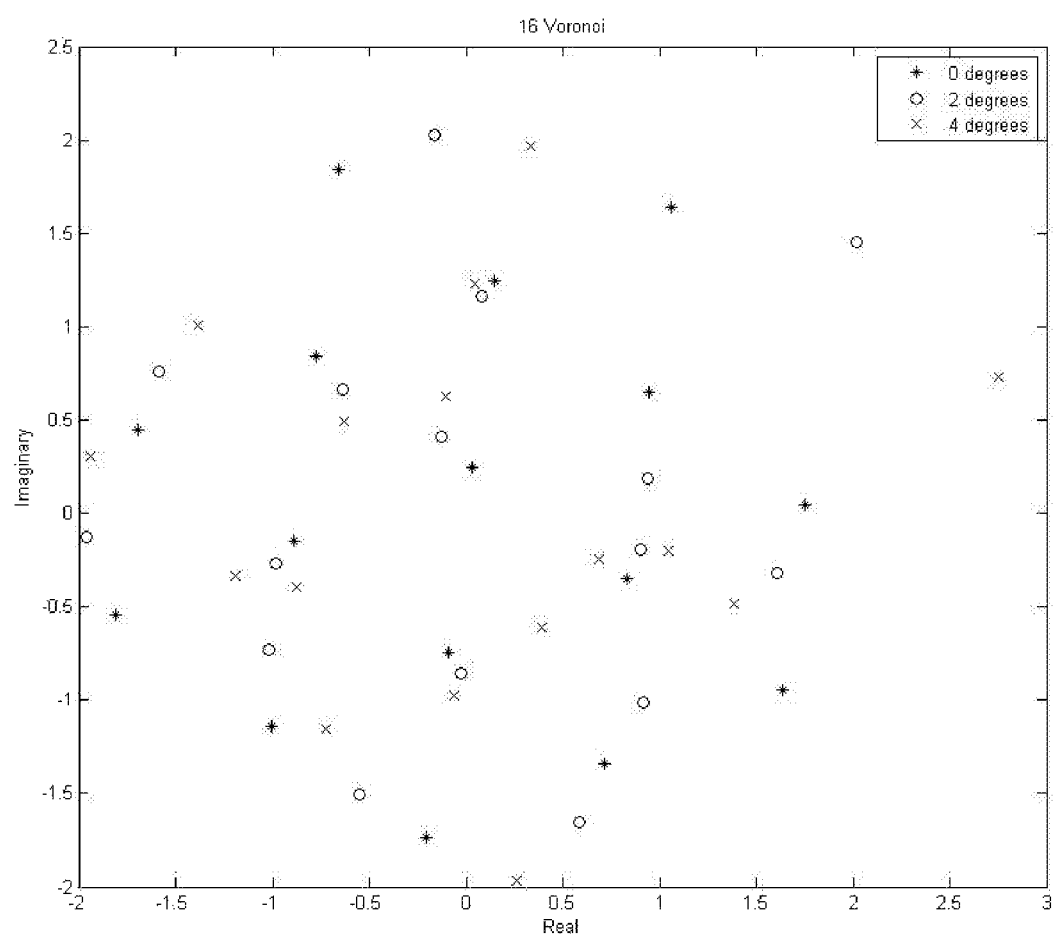
FIG. 5 shows the effect of an angle error relative to the transmission's direction θ in which the constellation is optimized for a Voronoi constellation with size 16.
Figure 6:
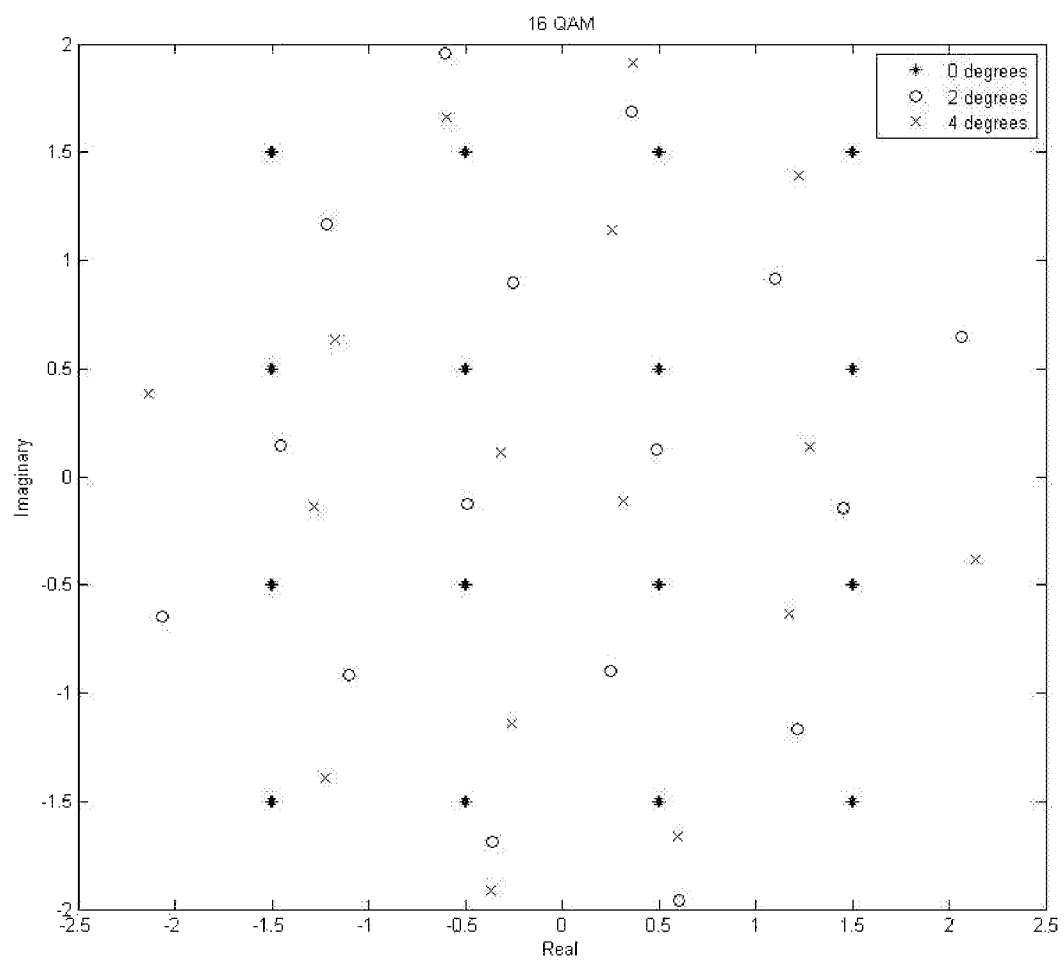
FIG. 6 shows the effect of an angle error relative to the transmission's direction θ in which the constellation is optimized for a 16-QAM constellation.
Figure 7:
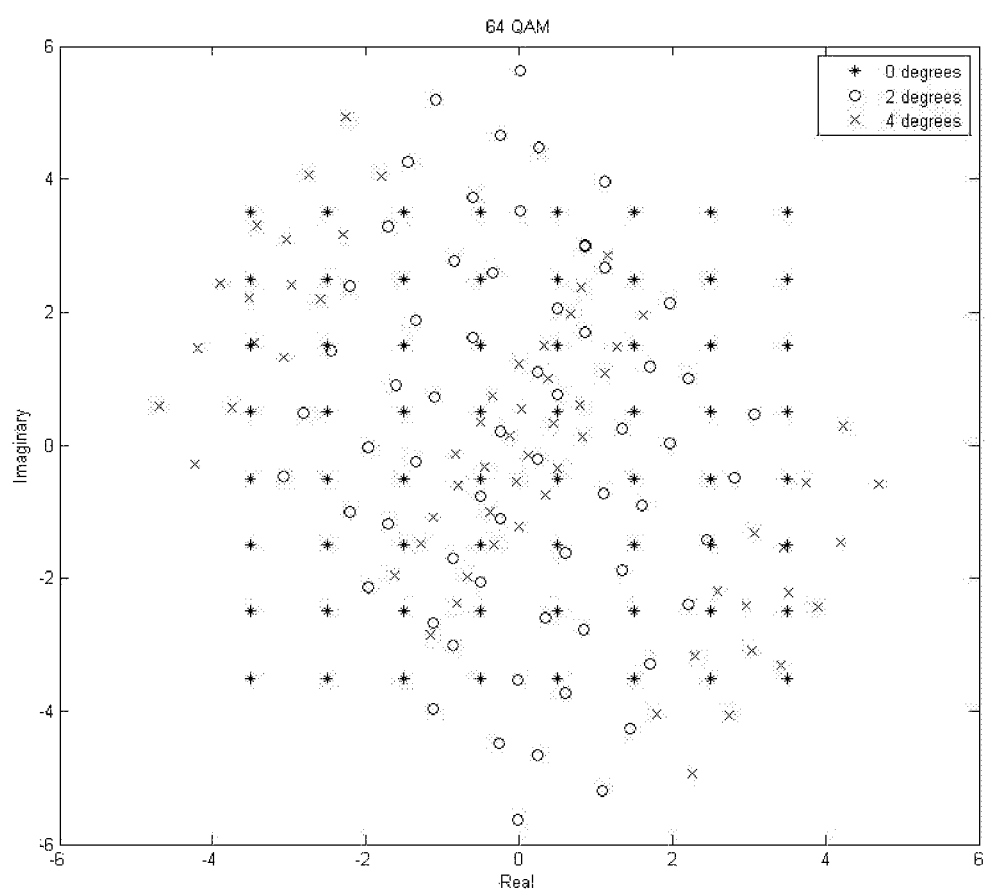
FIG. 7 shows the effect of an error angle relative to the transmission direction θ for a 64-QAM constellation.

In FIGS. 5, 6 and 7 it is shown the effect of an angle error to the radiation direction in which the constellation is optimized. The amplifiers gains associated to the array of antennas follow the sort order which appears in Tables 1 and 2 for linear sort and centered sort, respectively. It can be seen that constellations with higher dimensions have more sensibility to the transmission direction θ shown in FIG. 4. In FIG. 5 it is obvious the high degeneration on the resulting constellations associated with angle errors of Δθ=2° and Δθ=4°. In FIGS. 5 and 6 it can be seen that for constellations with same size, Voronoi constellations have a higher degeneration than QAM. The reason for that lies in the highest number or amplifiers, i.e. more BPKS components, and in consequence higher number of antennas. Voronoi constellations are not regular and they need a higher number of amplifiers as we can see on set of gains showed in tables 1 and 2. This leads to more sensitivity to any angle error relative the direction in which the constellation is configured and a higher directivity dependence of the transmitted information.

Even though embodiments of the various aspects have been described, many different alterations, modifications and the like thereof will become apparent for those skilled in the art. The described embodiments are thereof not intended to limit the scope of the present disclosure.

ABBREVIATIONS

BPSK Bi-Phase Shift Keying
FDE Frequency Domain Equalization
GMSK Gaussian Minimum Shift Keying
ISI Intersymbol Interference
MIMO Multiple- input Multiple-Output
MSK Minimum Shift Keying
OQPSK Ofset Quadrature Phase Shift Keying
QAM Quadrature Amplitude Modulation
QPSK Quadrature Pahse Shift Keying

CITATION LIST

[1] P. S. K. Leung and K. Feher, "F-QPSK—A Superior Modulation Technique for Mobile and Personal Communications", IEEE Trans. Broadcast., Vol. 39, pp. 288-294, June 1993.
[2] P. Montezuma and A. Gusmdo, "Design of TC-OQAM Schemes Using a Generalised Nonlinear OQPSK-type Format", IEE Elect. Letters, Vol. 35, No. 11, pp. 860-861, May 1999.
[3] P. Montezuma and A. Gusmdo, "On Analytically Described Trellis-Coded Modulation Schemes", ISCTA'01, Ambleside, UK, July 2001.
[4] C. A. Balanis, Antenna theory analysis and design, Wiley, N.Y., 1997.
[5] T. H. Ismail and M. M. Dawoud,"Null steering in phased arrays by controlling the element positions", IEEE Trans. Antennas Propag., pp. 1561-1566, No. 39, 1991.
[6] K. Guney and S. Basbug, "Interference suppression of linear antenna arrays by amplitude-only control using a bacterial foraging algorithm", In Prog. Electromagn. Res., pp: 475-497, PIER 79, 2008.
[7] M. M. Khodier and C. G. Christodoulou, "Linear array geometry synthesis with minimum sidelobe level and null control using particle swarm optimization", IEEE Trans Antennas Propag., pp. 2674-2679, No. 53, 2005.
[8] Astucia, V., "Linear amplification with multiple nonlinear devices", Faculty of Science and Technology, New University of Lisbon.
[9] Bucci, O, et al, "Optimal synthesis of difference patterns subject to arbitrary sidelobe bounds by using arbitrary array antennas", IEE Proceedings: Microwaves, Antennas and Propagation, Vol 152, No. 3, pp. 129-137, Jun. 26, 2005.
[10] European patent EP 1253759 (A1)2002-10-30.
[11] P. Montezuma, et al., "Power efficient coded 16-OQAM schemes over nonlinear transmitters", 34th IEEE Sarnoff Symposium, May 3, 2011.
[12] Luzio, M., et al., "Efficient Receivers for SC-FDE Modulations with offset", IEEE, Military Communications Conference 2012, MILCOM 2012.

What is claimed is:

1. A Transmission method with linear amplification using nonlinear amplifiers performed by a transmitting apparatus comprising:
   a serial-to-parallel converter converting an input stream of bits into a parallel signal;
   an antipodal converter electrically coupled to said serial-to-parallel converter and converting the bits $\beta_n^{(1)}, \ldots, \beta_n^{(\mu)}$ into $\mu$ polar signals $b_n^{(1)}, \ldots, b_n^{(\mu)}$;
   a mapping, generator receiving the polar signals $b_n^{(1)}, \ldots, b_n^{(\mu)}$ from the antipodal converter and generating M'≤M mapping sequences, where M' is the number of polar symbols in which a symbol from a generic constellation of dimension M is decomposed, defined by $$b_n^{eq(i)} = \prod_{m=1}^{\mu} (b_n^{(m)})^{\gamma(m,i)},$$

where i=0,2, ..., M−1, n is the order of the n-th symbol to transmit, m represents a auxiliary index with m=1, ... ,$\mu$, M=$\log_2(\mu)$ and $\gamma(m,i)$ is a binary term of $(\gamma_{(\mu-1,i)}, \gamma_{n-2,i}, \ldots, \gamma_{(1,i)}, \gamma_{(0,i)})$ which is the binary representation of i;
   a set of M' BPSK modulators, each one connected to each one of the outputs of the mapping generator, where each one of the M' polar components is modulated and multiplied by the corresponding complex coefficient $g_i$, resulting for each branch of order i the signal $$g_i b_n^{eq(i)} r(t-nT),$$

where n is the order of the element in the stream of symbols, r(t) is a pulse whose shape is selected to minimize envelope fluctuations, t represents the time, and T represents the time duration of each symbol;
   a set of M' nonlinear amplifiers, with each one amplifier connected to the output of each modulator, that amplifies the signal and with its output directly connected to an antenna.

2. A Transmission method with linear amplification using nonlinear amplifiers performed by a transmitting apparatus according to claim 1, wherein the M' polar sequences at mapping generator's output can be. modulated by M'/2 modulators into symbols according to a modulating scheme that can be QPSK, OQPSK, MSK or other quasi or constant envelope modulation.

3. A Transmission method with linear amplification using nonlinear amplifiers performed by a transmitting apparatus according claim 1, wherein the mapping generator's output sequences are the result of the decomposition of multilevel constellation symbols into a sum of polar signals expressed in terms of information bits $\beta^{(m)}$ for each $\alpha_n \in A$, where $a_n$ represents a constellation symbol, A represents the set of constellation's symbols, according to the expression $$a_n = g_0 + g_1 b_n^{(1)} + g_2 b_n^{(2)} + g_3 b_n^{(1)} b_n^{(2)} + g_4 b_n^{(3)} + \ldots = \sum_{i=0}^{M-1} g_i \prod_{m=1}^{\mu} (b_n^{(m)})^{\gamma(m,i)},$$

where $(\gamma_{(\mu-1,i)}, \gamma_{(\mu-2,i)}, \ldots, \gamma_{(1,i)}, \gamma_{(0,i)})$ is the binary representation of i, the m-th bit of the n-th symbol constellation relates to its polar representation through the relation $b_n^{(m)} = 2\beta_n^{(m)} - 1$ and $g_i$, i=0,1, ..., $\mu-1$ is a complex coefficient associated to the amplitude and phase of each component and where the M' outputs of the mapping generator are selected based on the terms present in the constellation's decomposition given by the above expression.

4. A Transmission method with linear amplification using nonlinear amplifiers performed by a transmitting apparatus according to claim 1, wherein the antenna connected to the output of each one nonlinear amplifier of the M' amplification branches, composed by the modulator and the nonlinear amplifier, can be replaced by an antenna array with K≥M' elements that can be one-dimensional or two-dimensional.

5. A Transmission method with linear amplification using nonlinear amplifiers performed by a transmitting apparatus to according to claim 1, wherein the transmitted symbol of a multilevel constellation is the sum of all the component signals radiated by all the the M' antennas.

6. Transmission method according to claim 1, wherein the n-th symbol of the transmitted signal, is given by $$a'_n = \sum_{i=0}^{M-1} F_{A_i} g_i \prod_{m=1}^{\mu} (b_n^{(m)})^{\gamma(m,i)}$$

with the array factor for one antenna of order i given by $$F_{A_i} = e^{j2\pi i \frac{d}{\lambda} \cos\left(\frac{\kappa}{2} + \theta\right)},$$

where j is the imaginary unity, d is the distance between antennas, $\lambda$ is the wavelength and $\theta$ is the direction angle in which the transmitter optimizes the constellation with the Information symbols, and the transmitted constellations of 16, 32 e 64 symbols' spatial arrangements vary with due to the angle $\theta$.

\* \* \* \* \*